(12) United States Patent
Germanow et al.

(10) Patent No.: US 6,170,983 B1
(45) Date of Patent: Jan. 9, 2001

(54) THERMOMETER CALIBRATOR

(75) Inventors: Andrew C. Germanow, Palmyra; Robert I. Marsh, Brockport, both of NY (US)

(73) Assignee: Germanow-Simon Corporation, Rochester, NY (US)

(*) Notice: Under 35 U.S.C. 154(b), the term of this patent shall be extended for 0 days.

(21) Appl. No.: 09/309,641

(22) Filed: May 11, 1999

Related U.S. Application Data

(60) Provisional application No. 60/085,644, filed on May 15, 1998.

(51) Int. Cl.[7] .................................................. G01K 15/00
(52) U.S. Cl. ........................................... 374/1; 374/3
(58) Field of Search ................................ 374/1, 3

(56) References Cited

U.S. PATENT DOCUMENTS

| | | | |
|---|---|---|---|
| 1,661,323 | * 12/1928 | Crosthwait, Jr. | 374/3 |
| 1,694,164 | 12/1928 | Crosthwait, Jr. | 374/3 |
| 2,162,614 | 6/1939 | Fry et al. | 374/1 |
| 2,194,414 | * 3/1940 | Batterman | 374/1 |
| 2,758,469 | 8/1956 | Clements et al. | 374/1 |
| 3,099,878 | * 8/1963 | Woods | 374/1 |
| 3,122,018 | 2/1964 | Freeman et al. | 374/1 |
| 3,247,701 | * 4/1966 | Lawler | 374/1 |
| 3,606,792 | 9/1971 | Yoshimoto . | |
| 3,623,370 | 11/1971 | Busch et al. . | |
| 3,699,800 | 10/1972 | Waldron | 73/1 F |
| 3,902,351 | * 9/1975 | Kreps | 374/1 |
| 4,075,882 | 2/1978 | Waldron | 73/1 F |
| 4,079,618 | 3/1978 | King | 73/1 F |
| 4,134,299 | 1/1979 | Riieger | 73/362.8 |
| 4,369,351 | 1/1983 | Bowles | 215/413 |
| 4,445,455 | * 5/1984 | Cannon | 374/1 |
| 4,479,726 | 10/1984 | Townsend | 374/1 |
| 4,749,281 | 6/1988 | Nunes | 374/206 |
| 4,788,871 | 12/1988 | Nelson et al. | 73/866.5 |
| 4,819,249 | 4/1989 | Ekstrom et al. | 374/1 |
| 4,901,257 | 2/1990 | Chang et al. | 374/1 |
| 4,904,091 | 2/1990 | Ward | 374/179 |
| 5,345,064 | 9/1994 | Hesse | 374/1 |
| 5,678,923 | 10/1997 | Germanow et al. | 374/1 |
| 5,685,642 | * 11/1997 | Gaskell | 374/206 |
| 5,775,488 | 7/1998 | Vaught | 374/1 |

* cited by examiner

*Primary Examiner*—G. Bradley Bennett
*Assistant Examiner*—Gail Verbitsky
(74) *Attorney, Agent, or Firm*—Eugene Stephens & Associates

(57) ABSTRACT

A thermometer stem is inserted into a thermally controlled receptacle housed by the calibrator to bring the thermometer to a calibration temperature. A socket in the housing engages and holds the adjustment nut of the thermometer so that the casing of the thermometer can be adjusted while the thermometer remains inserted in the calibrator. The socket includes multiple openings of progressively smaller dimension to allow calibration of thermometers using different size adjusters without having to attach or remove an adapter. A wrench can be included for rotating thermometer casings, enhancing ease of use of the device.

29 Claims, 4 Drawing Sheets

THERMOMETER CALIBRATOR

This application claims the benefit of U.S. Provisional Application Ser. No. 60/085,644, filed on May 15, 1998, which provisional application is incorporated by reference herein.

FIELD OF THE INVENTION

The invention relates to the calibration of stem thermometers. Examples of applications in which such thermometers are used are cooking, laboratory work, or testing, though the thermometers can be used to measure any suitable medium.

BACKGROUND OF THE INVENTION

Stem thermometers have a stem that can be inserted into a medium to measure its temperature. One popular use for stem thermometers is monitoring cooking food, especially meat. Throughout the specification, this use will serve as an example, even though the invention can be used to calibrate thermometers applied to many other purposes.

In cooking, a dial and a pointer of a stem thermometer indicate the temperature of the interior of the food. These thermometers need to be calibrated occasionally to ensure accurate temperature measurement and, in the case of food monitoring, optimum cooking of the food. An improperly adjusted or off-calibration thermometer can cause serious problems. In the case of meat cooking, undercooking can result in serious illness, while overcooking shrinks the meat and alters the flavor, making the meat less palatable.

Stem thermometers used in restaurants are sometimes calibrated by comparison with each other, which can lead to error if the comparison standard thermometer is off calibration. Testing laboratories calibrate thermometers with special equipment that is too expensive and cumbersome for restaurant use, though smaller and portable calibrators are available. Use of these calibrators involves holding the thermometer stem in thermal communication with a heat sink raised to a calibration temperature and using a wrench to turn an adjuster on the back of the thermometer to bring the dial and pointer into calibration.

DESCRIPTION OF THE RELATED PRIOR ART

U.S. Pat. No. 4,749,281 to Nunes discloses a universal thermometer movement that can be used in a variety of thermometer housings, indicators, and scales. This device is related to thermometers of the type calibrated by the instant invention. One embodiment of the movement comprises a coil support, a casing, a bimetallic coil, an arbor, and an attachment point to which an end of the coil is attached. A socket receives the arbor, the outer end of the socket being threaded to receive washers and a nut such that the socket can be tightened into place within a central aperture. Rotation of the coil support relative to the casing calibrates the thermometer movement. However, the patent does not disclose any way to determine the amount of relative rotation to impart to the movement to achieve proper calibration.

U.S. Pat. No. 1,694,164 to Crosthwait, Jr. discloses a method and apparatus for setting or adjusting thermostats of the type used in thermostatic steam traps. The specification of Crosthwait implies that the method and apparatus are used only in the assembly and installation of the thermostat. A casing forms a steam space and is closed by a top or cap having a flange that screws into the casing. The thermostatic member is a disk that expands when heated, usually as a result of the expansion of a fluid contained within the disk. A stud extends from one surface of the disk and screws into a socket projecting from the top to hold the thermostat in place in the trap. The thermostat is adjusted by screwing the stud into or out of the socket via a nut, thereby moving the disk in relation to the top.

The method and apparatus of Crosthwait require the use of three devices and many steps to calibrate thermostats. First, the thermostat alone is measured by one device that fills the thermostat with compressed air to simulate the fluid later placed in the thermostat. Then, a second device measures the change in the thermostat size as a result of mounting it in the trap top and filling it with fluid. Finally, a third device is used to adjust the thermostat after it is in the trap top. The specification does not suggest that this adjustment could be performed at the site where the thermostat is used to calibrate the thermostat after a period of use, nor does it provide for easy, one-step calibration.

U.S. Pat. No. 4,079,618 to King discloses a dry well for a temperature calibration system of the general type contemplated for use with the invention. An electronically controlled heat sink is provided into which a thermometer or temperature probe is inserted for calibration. After selecting a test temperature, the user inserts the component to be tested into a receptacle in the calibrator to heat the component to the test temperature. However, while this device is called a "calibration system," it only allows a user to test the accuracy of a thermometer. To calibrate the thermometer, the user must insert a wrench behind the thermometer head to engage and hold the thermometer adjuster. While holding the adjuster in position, the operator must rotate the thermometer head to adjust the reading. The operation can be awkward and inconvenient.

U.S. Pat. No. 4,901,257 to Chang et al. discloses another temperature calibration system. The system includes a temperature well that holds the probe to be calibrated and is very similar to the device disclosed in U.S. Pat. No. 4,079,618 to King. The temperature of the well is controlled by an electronic control system. While the device includes components that allow it to calibrate itself, there are no provisions for the calibration of the temperature probe other than a display of the temperature of the well, which can then be compared with the temperature probe readout. Thus, as with King above, the thermometer must be calibrated with an awkward and inconvenient process of inserting a wrench behind the thermometer head and holding the adjuster in place while rotating the head until the thermometer shows no significant discrepancy in its reading.

U.S. Pat. No. 4,819,249 to Ekstrom et al. discloses a device for determining the accuracy of a thermally activated instrument, such as a thermometer or temperature probe. An enclosure holds the instrument to be tested and heats the instrument using electric current. An external electric controller controls the temperature of the enclosure. Again, this device only allows the user to test the accuracy of the instrument. Calibration must be performed in a manner similar to that used in the King and Chang et al. devices, making calibration an inconvenient and awkward process.

U.S. Pat. No. 5,678,923 to Germanow et al., the disclosure of which is hereby incorporated by reference, discloses a thermometer calibrator that is similar to the instant invention. The Germanow et al. device has a socket into which the stem of a thermometer is inserted, the socket being shaped to hold the adjuster or adjustment nut of the thermometer in place while the thermometer head is rotated to calibrate the thermometer. The Germanow et al. calibrator allows for calibration of thermometers that have different sized nuts.

However, as seen in FIGS. 4–7, this is achieved using an external adapter plate screwed onto the outside of the casing, the plate having an opening configured to hold nuts narrower than those the socket can handle. This can be inconvenient and time consuming if a batch of thermometers of different adjuster sizes is being calibrated, requiring the adapter to be put on and removed repeatedly.

SUMMARY OF THE INVENTION

The inventive thermometer calibrator allows calibration of thermometers using adjustment nuts of different sizes without having to attach an adapter plate to the outside of the housing over the calibration socket. Instead, the calibration socket is staggered, having a larger opening at an outer level, and one or more smaller openings at respective inner levels, the openings getting smaller the farther into the casing they are. The outermost, largest opening can be formed in the housing while the inner, smaller openings can be formed in a block held in the socket or even held by the outermost opening itself. This provides a way for the inner openings to be changed by changing the block held in the socket or in the outermost opening. The user can thus conveniently adjust the position of a thermometer dial relative to a thermometer pointer while testing the accuracy of the thermometer. To do so, the user inserts the thermometer stem into a thermally controlled receptacle within the housing of the calibrator. The calibration socket engages the adjuster on the base of the thermometer casing with the opening sized for the adjuster of the thermometer. When the thermometer's temperature reading stabilizes, the user simply rotates the casing of the thermometer until the pointer indicates the calibration temperature. If the casing of the thermometer cannot easily be turned by hand, a wrench can be used to grasp the casing or head of the thermometer and rotate it while the socket engages the adjuster or adjustment nut. Additionally, a removable sleeve can be placed in the receptacle to keep the interior of the receptacle clean and can be removed for easy cleaning.

Our invention thus eliminates the necessity for attaching an adapter plate to the exterior of a thermometer calibrator to accommodate adjusters of different sizes. Our invention also eliminates the need for inserting a wrench behind a thermometer to calibrate the thermometer. By providing a calibrator that engages and holds the thermometer adjuster with a multi-level socket opening, the user can simply insert the thermometer into the calibration receptacle until the appropriate opening engages the adjuster, then rotate the thermometer casing without the awkwardness of inserting a wrench behind the thermometer while holding the casing as required by prior art calibrators. Our invention further provides a convenient, easy way to calibrate thermometers to ensure that they give accurate temperature readouts. Further still, our invention provides a simpler, less expensive calibrator. By making it easier and less expensive for thermometer users to calibrate their instruments, especially those who use cooking thermometers, waste of resources and danger to the consumer can both be reduced.

DETAILED DESCRIPTION OF THE INVENTION

Figure 1:
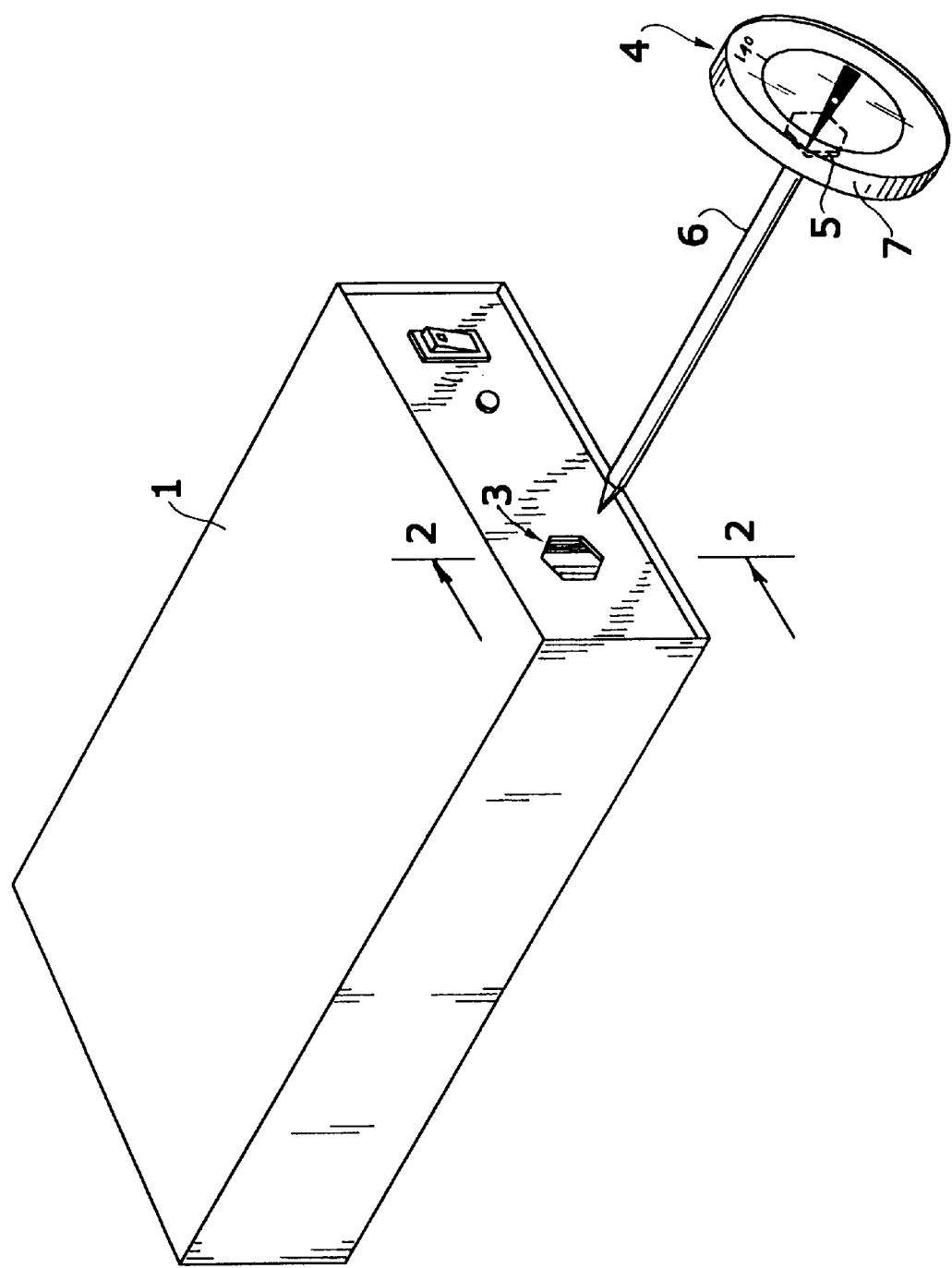
FIG. 1 is an isometric view of a thermometer calibrator of the invention positioned to receive a thermometer to be calibrated.
Figure 2:
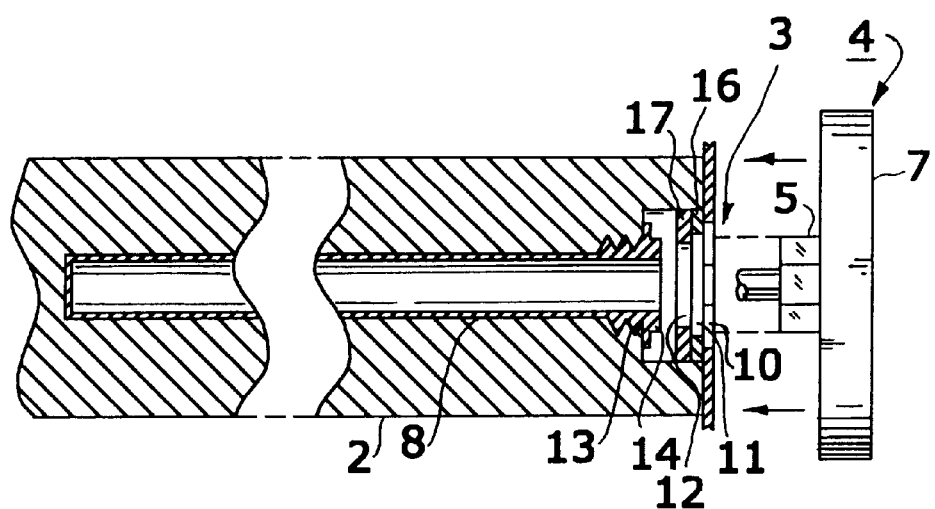
FIG. 2 is a fragmentary cross section of the calibrator of FIG. 1, taken along the line 2—2 thereof, showing the staggered, multi-level socket of the invention.
Figure 3:
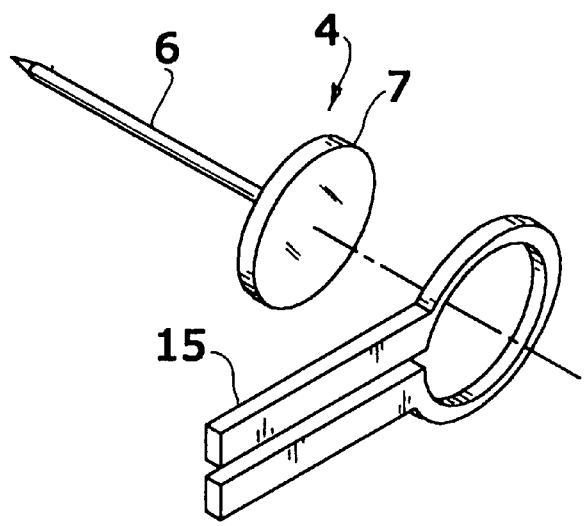
FIG. 3 is an isometric perspective view of a preferred wrench for adjusting a thermometer casing.
Figure 6:
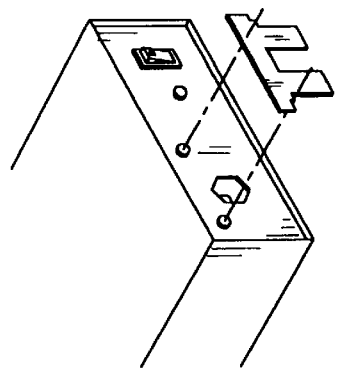
FIG. 6 is a fragmentary isometric view of a front panel of the prior art thermometer calibrator of FIG. 4 showing an adapter usable for changing the size of a calibration socket.
Figure 7:
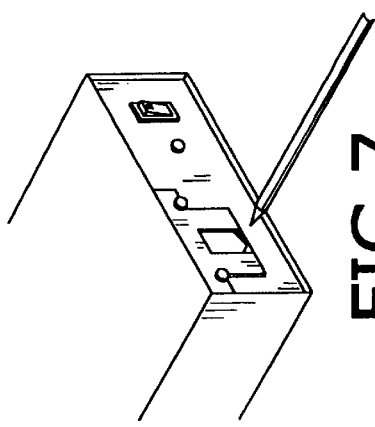
FIG. 7 is a fragmentary isometric view, similar to the view of FIG. 6, showing the prior art calibrator socket adapter positioned on the prior art calibrator.
Figure 5:
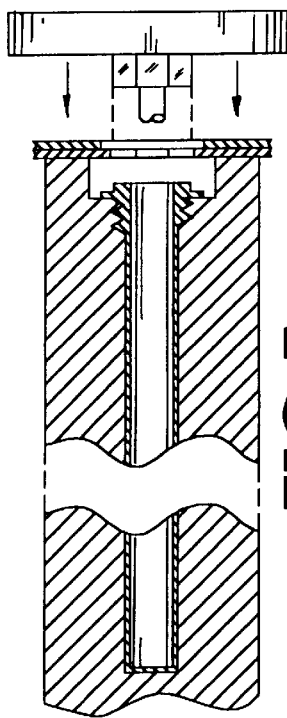
FIG. 5 is a fragmentary cross section of the calibrator of FIG. 4, taken along the line 5—5 thereof.
Figure 4:
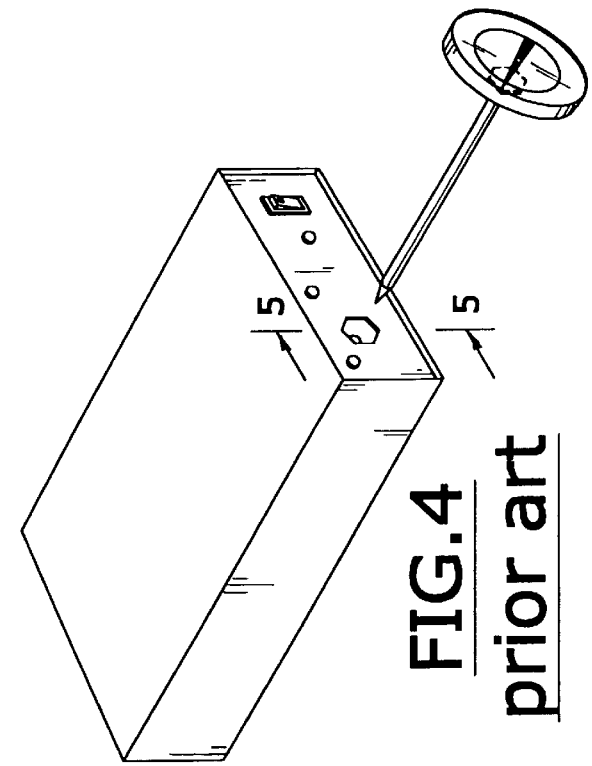
FIG. 4 is an isometric view of a prior art thermometer calibrator.

With reference to the exemplary embodiment of the invention shown in FIGS. 1–3, the invention is a thermometer calibrator comprising a housing 1 and a thermally controlled receptacle 2 for a thermometer stem 6 arranged in similar fashion to the device disclosed in U.S. Pat. No. 5,678,923 to Germanow et al., the disclosure of which has been incorporated by reference. The receptacle 2 is heated and controlled by a system of the type illustrated in, for example, the King and Chang et al. patents discussed above, though any such control unit could be used to control the receptacle 2.

The housing 1 has a calibration socket 3 that is preferably shaped to engage an adjuster 5, in the form of an adjustment nut, on the thermometer 4. The preferred calibration socket 3 is non-circular, but it could be shaped and/or sized to allow the adjuster to pass through the outermost layer of the socket. When the stem 6 of the thermometer 4 is inserted through calibration socket 3, the socket 3 engages the adjuster 5 on the thermometer 4. This engagement holds the adjuster 5 against rotation to facilitate adjustment of the thermometer 4 while the thermometer 4 remains inserted in the receptacle 2.

To accommodate adjusters 5 of different sizes, the socket 3 includes multiple openings 10, 11, 12 of progressively smaller size at levels further within the housing 1 of the calibrator as seen particularly in FIG. 2. Using this multi-level construction of the socket 3 allows calibration of thermometers 4 using different sized adjusters 5 simply by inserting the thermometer 4 into the receptacle until the adjuster 5 engages the opening 10, 11, 12 of the appropriate size. The adjuster 5 is thus held in place while the casing 7 of the thermometer 4 is rotated to calibrate the thermometer 4. The openings 10, 11, 12 can all be formed as part of the housing 1, as by machining or milling if the housing 1 is metal or by molding, such as injection molding or blow molding, if the housing 1 is plastic. In this case, the thickness of the housing 1 should be less than the thickness of the adjuster 5 corresponding to the innermost opening 12 to ensure engagement and holding of the adjuster 5 against rotation. Alternatively, just the outermost opening 10 can be formed in the housing 1 with the inner openings 11, 12 being cut or molded from plates 16, 17 fixedly mounted in the socket 3. Here, the total thickness of the housing 1 and plates 16, 17 should be less than the thickness of the adjuster 5 corresponding to the innermost opening 12 to ensure engagement and holding of the adjuster 5 against rotation.

Figure 8:
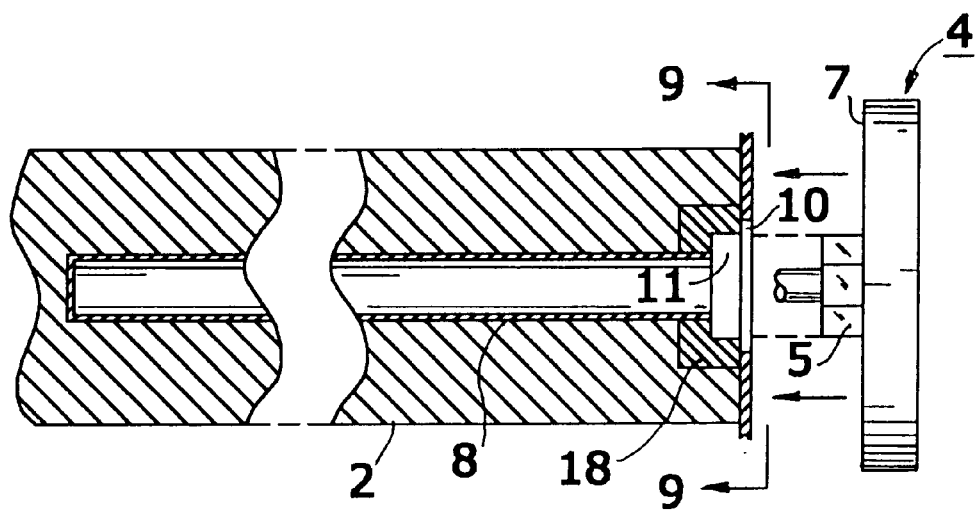
FIG. 8 is a fragmentary cross section of a calibrator similar to that of FIG. 4, taken along the line 5—5 thereof, but using a block instead of plates for the smaller opening.
Figure 9:
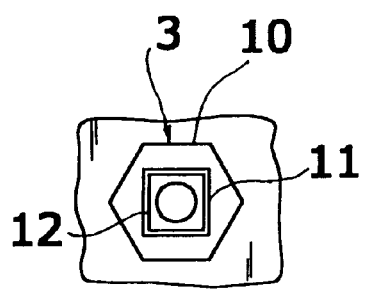
FIGS. 9 and 10 are a fragmentary frontal views of the socket of the invention, such as might be taken along the line 9—9 of FIG. 8, illustrating the preferred appearance, layout, and arrangement of the openings of the socket.
Figure 10:
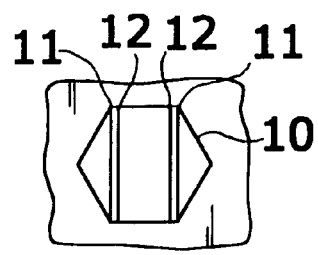

Alternatively, and especially where only two openings 10, 11 are used, the outer, larger opening 10 can be formed in the housing 1 while the inner, smaller opening 11 is formed in a block 18 held in the socket 3 or in the receptacle 2, as seen in FIG. 8, though more openings could conceivably be made this way. The block 18 can be made and installed so that it can be removed and replaced with a block with different sized openings should the needs of the user warrant such a change. The block 18 could be held by threads or flats in the socket. FIG. 9 shows how the openings 10, 11, 12 can look when viewed head on. Note that the openings 10, 11, 12 can have a hexagonal or rectangular shape and that the inner openings 11, 12 can simply provide two opposed sides that will engage an adjuster 5 smaller than the outer opening(s) as particularly seen in FIG. 10.

The receptacle 2 can accommodate a removable sleeve 8 that engages the stem 6 of the thermometer 4, protects the receptacle 2 from becoming soiled, and allows easy cleaning. In the preferred embodiment, the sleeve 8 engages as much of the stem 6 of the thermometer as possible to ensure proper heating of the stem and is held in place by threads 13. The outside end of the sleeve 8 can include a removal flange 14 or the like that, in the preferred embodiment, takes the form of a hexagonal nut integral with the sleeve 8. The operator can then remove the sleeve 8 by inserting a wrench through the calibration socket 3 to engage the removal flange.

In operation, the operator powers up the calibrator and inserts the thermometer stem 6 through the calibration socket 3 into the sleeve 8 until one of the openings 10, 11, 12 of the calibration socket 3 engages the adjuster 5 of the thermometer 4. When the temperature indicated by the thermometer 4 has stabilized, the operator rotates the casing 7 of the thermometer 4 until the pointer of the thermometer 4 is pointing to the calibration temperature. If the thermometer casing 7 is difficult to turn, the operator can use a wrench 15, preferably included with the calibrator, to rotate the head.

In the preferred embodiment of the invention, the calibration temperature is preset and cannot be changed by the operator. To this end, tamper-resistant closures, such as tamper-proof screws, hold the housing closed so that operators of the calibrator will have great difficulty opening the case. However, it is well within the scope of the invention to have an adjustable calibration temperature as well as suitable displays and controls to allow the operator to choose a calibration temperature.

The instant invention allows much more convenient and efficient calibration of thermometers. Thermometers can be calibrated while still being maintained at the calibration temperature, eliminating the awkward and inconvenient calibration process required by prior art calibrators. Further, the calibrator of the instant invention allows for the quick and easy calibration of a number of thermometers at one sitting. If the operator has a number of thermometers to calibrate one after another, the thermometer 4 can be removed and each successive thermometer inserted and calibrated without requiring swapping of adapters, yielding a versatile, easy to use, time-saving calibrator.

We claim:

1. A thermometer calibrator including:
    a multi-level calibration socket in a housing within which sits a thermally controlled receptacle for a stem of a thermometer to be calibrated, the calibration socket being substantially coaxial with the receptacle;
    a largest opening of the calibration socket;
    at least one smaller opening of the calibration socket arranged inwardly from the largest opening, the calibration socket thereby including at least two openings shaped to receive different sized adjusters of thermometers to be calibrated;
    the calibration socket openings holding the adjuster such that while the thermometer stem is inserted in the receptacle, a casing of the thermometer can be rotated relative to the adjuster to calibrate the thermometer; and
    the calibration socket openings allowing the calibration of thermometers using different sized adjusters without requiring the installation of adapters to accommodate smaller adjusters after a thermometer with a larger adjuster has been calibrated.

2. The calibrator of claim 1 further including a removable sleeve shaped to receive the stem of the thermometer.

3. The calibrator of claim 2 wherein the sleeve is removed and inserted through the calibration socket.

4. The calibrator of claim 2 wherein the sleeve includes a removal flange.

5. The calibrator of claim 1 including a wrench for rotating the casing of the thermometer.

6. The calibrator of claim 1 wherein all but an outermost opening of the multi-level calibration socket are formed in plates installed in the socket inwardly from the housing.

7. A method of calibrating thermometers including the steps of:
    providing a calibrator that includes a housing with a multi-level calibration socket therein arranged to receive thermometer adjusters of progressively smaller sizes, the calibrator further containing a thermally controlled receptacle that receives a stem of a thermometer and heats it to a calibration temperature;
    maintaining the temperature of the receptacle at substantially the calibration temperature;
    inserting a stem of a thermometer through the calibration socket into the receptacle until an adjuster of the thermometer is engaged by the socket corresponding to the adjuster and holding the adjuster of the thermometer against rotation; and
    calibrating the thermometer while the stem remains inserted in the receptacle.

8. The method of claim 7 wherein the step of calibrating includes the sub-step of rotating a head of the thermometer while the thermometer adjuster is held by the calibration socket until a pointer of the thermometer points to the calibration temperature.

9. The method of claim 7 wherein the step of providing includes the sub-step of inserting a sleeve into the receptacle before inserting the thermometer stem.

10. The method of claim 7 further including the step of providing a wrench and the step of calibrating includes rotating a casing of the thermometer with the wrench.

11. The method of claim 7 wherein the step of providing a calibrator includes sizing the receptacle to receive a stem of a thermometer whose adjuster corresponds to a smallest, innermost opening of the calibration socket.

12. A thermometer calibrator comprising:
    a socket, including at least two openings, that engages and holds an adjuster of a thermometer;
    a largest opening of the at least two openings being an outermost opening of the at least two openings;
    respective openings of the at least two openings being sized to engage and hold adjusters of respective sizes;
    a housing within which components of the calibrator reside; and a thermally controlled receptacle inside the housing and into which the socket leads, the receptacle heating a stem of the thermometer to a predetermined calibration temperature.

13. The thermometer calibrator of claim 12 wherein the receptacle includes a removable sleeve.

14. The thermometer calibrator of claim 12 further including a wrench for rotating the thermometer casing.

15. The thermometer calibrator of claim 12 further including a block mounted within the housing and in which at least one of the at least two openings is formed.

16. The thermometer calibrator of claim 13 wherein the largest, outermost opening is formed in the housing and an additional, smaller opening is formed in the block, the block being arranged inwardly from the largest opening.

17. The thermometer calibrator of claim 12 wherein all openings of the socket are formed in the housing.

18. The thermometer calibrator of claim 17 wherein the housing is plastic and the openings are formed by injection molding.

19. The thermometer calibrator of claim 17 wherein the housing is metal and the openings are formed by machining.

20. The thermometer calibrator of claim 12 wherein at least one of the openings is formed in a plate.

21. The thermometer calibrator of claim 20 wherein each opening is formed in a respective plate.

22. The thermometer calibrator of claim 20 wherein the largest opening is formed in the housing and each of the at least one smaller openings is formed in a respective plate.

23. The thermometer calibrator of claim 1 further including a block mounted within the housing and in which at least one of openings is formed.

24. The thermometer calibrator of claim 23 wherein the largest, outermost opening is formed in the housing and the at least one smaller opening is formed in the block, the block being arranged inwardly from the largest opening.

25. The thermometer calibrator of claim 1 wherein at least one of the openings is formed in a plate.

26. The thermometer calibrator of claim 25 wherein each opening is formed in a respective plate.

27. The thermometer calibrator of claim 25 wherein the largest opening is formed in the housing and each of the at least one smaller openings is formed in a respective plate.

28. The thermometer calibrator of claim 23 wherein the block is a first block and is removable, allowing replacement of the first block with another block including at least one other opening of a different size than the at least one opening in the first block.

29. The thermometer calibrator of claim 25 wherein the block is a first block and is removable, allowing replacement of the first block with another block including at least one other opening of a different size than the at least one opening in the first block.

* * * * *